United States Patent
Nasiri et al.

(10) Patent No.: US 7,934,423 B2
(45) Date of Patent: *May 3, 2011

(54) VERTICALLY INTEGRATED 3-AXIS MEMS ANGULAR ACCELEROMETER WITH INTEGRATED ELECTRONICS

(75) Inventors: Steven S. Nasiri, Saratoga, CA (US); Goksen G. Yaralioglu, Mountain View, CA (US); Joseph Seeger, Menlo Park, CA (US); Babak Taheri, San Francisco, CA (US)

(73) Assignee: Invensense, Inc., Sunnyvale, CA (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/953,762

(22) Filed: Dec. 10, 2007

(65) Prior Publication Data

US 2009/0145225 A1  Jun. 11, 2009

(51) Int. Cl.
*G01P 15/08* (2006.01)
*G01P 15/125* (2006.01)

(52) U.S. Cl. .................. 73/514.02; 73/514.32

(58) Field of Classification Search .............. 73/514.02, 73/514.01, 514.32
See application file for complete search history.

(56) References Cited

U.S. PATENT DOCUMENTS

| 4,510,802 A | 4/1985 | Peters |
| 4,601,206 A | 7/1986 | Watson |
| 4,736,629 A | 4/1988 | Cole |
| 4,783,742 A | 11/1988 | Peters |
| 4,841,773 A | 6/1989 | Stewart |
| 5,251,484 A * | 10/1993 | Mastache .................. 73/514.02 |
| 5,349,858 A * | 9/1994 | Yagi et al. ................. 73/514.02 |
| 5,359,893 A | 11/1994 | Dunn |
| 5,367,631 A | 11/1994 | Levy |
| 5,415,040 A * | 5/1995 | Nottmeyer ................ 73/514.02 |
| 5,433,110 A | 7/1995 | Gertz et al. |
| 5,440,326 A | 8/1995 | Quinn |
| 5,444,639 A | 8/1995 | White |

(Continued)

FOREIGN PATENT DOCUMENTS

EP  0429391  8/1995

OTHER PUBLICATIONS

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.

(Continued)

*Primary Examiner* — Helen C. Kwok
(74) *Attorney, Agent, or Firm* — Sawyer Law Group, P.C.

(57) ABSTRACT

Sensors for measuring angular acceleration about three mutually orthogonal axes, X, Y, Z or about the combination of these axes are disclosed. The sensor comprises a sensor subassembly. The sensor subassembly further comprises a base which is substantially parallel to the X-Y sensing plane; a proof mass disposed in the X-Y sensing plane and constrained to rotate substantially about the X, and/or Y, and/or Z, by at least one linkage and is responsive to angular accelerations about the X, and/or Y, and/or Z directions. Finally, the sensor includes at least one electrode at the base plate or perpendicular to the base plate and at least one transducer for each sensing direction of the sensor subassembly responsive to the angular acceleration. Multi-axis detection is enabled by adjusting a configuration of flexures and electrodes.

21 Claims, 12 Drawing Sheets

U.S. PATENT DOCUMENTS

| | | | |
|---|---|---|---|
| 5,511,419 A | 4/1996 | Dunn | |
| 5,541,860 A | 7/1996 | Takei et al. | |
| 5,574,221 A * | 11/1996 | Park et al. | 73/514.02 |
| 5,629,988 A | 5/1997 | Burt et al. | |
| 5,635,638 A | 6/1997 | Geen | |
| 5,698,784 A | 12/1997 | Hotelling | |
| 5,703,293 A | 12/1997 | Zabler et al. | |
| 5,703,623 A | 12/1997 | Hall et al. | |
| 5,734,373 A | 3/1998 | Rosenberg et al. | |
| 5,780,740 A | 7/1998 | Lee et al. | |
| 5,825,350 A | 10/1998 | Case, Jr. | |
| 5,895,850 A | 4/1999 | Buestgens | |
| 5,898,421 A | 4/1999 | Quinn | |
| 5,955,668 A | 9/1999 | Hsu et al. | |
| 5,992,233 A | 11/1999 | Clark | |
| 5,996,409 A | 12/1999 | Funk et al. | |
| 6,067,858 A | 5/2000 | Clark et al. | |
| 6,122,961 A | 9/2000 | Geen et al. | |
| 6,134,961 A | 10/2000 | Touge et al. | |
| 6,158,280 A * | 12/2000 | Nonomura et al. | 73/504.04 |
| 6,189,381 B1 | 2/2001 | Huang et al. | |
| 6,230,564 B1 * | 5/2001 | Matsunaga et al. | 73/514.01 |
| 6,250,156 B1 | 6/2001 | Seshia et al. | |
| 6,250,157 B1 | 6/2001 | Touge | |
| 6,269,254 B1 | 7/2001 | Mathis | |
| 6,279,043 B1 | 8/2001 | Hayward et al. | |
| 6,292,170 B1 | 9/2001 | Chang et al. | |
| 6,343,349 B1 | 1/2002 | Braun et al. | |
| 6,370,937 B2 | 4/2002 | Hsu | |
| 6,374,255 B1 | 4/2002 | Peurach et al. | |
| 6,386,033 B1 | 5/2002 | Negoro | |
| 6,391,673 B1 | 5/2002 | Ha et al. | |
| 6,393,914 B1 * | 5/2002 | Zarabadi et al. | 73/514.04 |
| 6,424,356 B2 | 7/2002 | Chang et al. | |
| 6,429,895 B1 | 8/2002 | Onuki | |
| 6,430,998 B2 | 8/2002 | Kawai et al. | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,369 B1 | 11/2002 | Sato | |
| 6,487,908 B2 | 12/2002 | Geen et al. | |
| 6,494,096 B2 | 12/2002 | Sakai et al. | |
| 6,508,122 B1 | 1/2003 | McCall et al. | |
| 6,508,125 B2 | 1/2003 | Otani | |
| 6,513,380 B2 | 2/2003 | Reeds, III et al. | |
| 6,520,017 B1 * | 2/2003 | Schoefthaler et al. | 73/514.02 |
| 6,533,947 B2 | 3/2003 | Nasiri et al. | |
| 6,573,883 B1 | 6/2003 | Bartlett | |
| 6,636,521 B1 | 10/2003 | Giulianelli | |
| 6,646,289 B1 | 11/2003 | Badehi | |
| 6,668,614 B2 | 12/2003 | Itakura | |
| 6,720,994 B1 | 4/2004 | Grottodden et al. | |
| 6,725,719 B2 | 4/2004 | Cardarelli | |
| 6,758,093 B2 | 7/2004 | Tang et al. | |
| 6,794,272 B2 | 9/2004 | Turner et al. | |
| 6,796,178 B2 | 9/2004 | Jeong et al. | |
| 6,823,733 B2 | 11/2004 | Ichinose | |
| 6,834,249 B2 | 12/2004 | Orchard | |
| 6,845,669 B2 | 1/2005 | Acar et al. | |
| 6,848,304 B2 | 2/2005 | Geen | |
| 6,859,751 B2 | 2/2005 | Cardarelli | |
| 6,860,150 B2 | 3/2005 | Cho | |
| 6,892,575 B2 | 5/2005 | Nasiri et al. | |
| 6,915,693 B2 | 7/2005 | Kim et al. | |
| 6,918,297 B2 | 7/2005 | MacGugan | |
| 6,918,298 B2 | 7/2005 | Park | |
| 6,938,484 B2 | 9/2005 | Najafi et al. | |
| 6,939,473 B2 | 9/2005 | Nasiri et al. | |
| 6,955,086 B2 | 10/2005 | Yoshikawa et al. | |
| 6,963,345 B2 | 11/2005 | Boyd et al. | |
| 6,972,480 B2 | 12/2005 | Zilber et al. | |
| 6,981,416 B2 | 1/2006 | Chen et al. | |
| 7,004,025 B2 | 2/2006 | Tamura | |
| 7,028,546 B2 | 4/2006 | Hoshal | |
| 7,028,547 B2 | 4/2006 | Shiratori et al. | |
| 7,036,372 B2 | 5/2006 | Chojnacki et al. | |
| 7,040,163 B2 | 5/2006 | Shcheglov et al. | |
| 7,040,922 B2 | 5/2006 | Harney et al. | |
| 7,057,645 B1 | 6/2006 | Hara et al. | |
| 7,077,007 B2 * | 7/2006 | Rich et al. | 73/514.02 |
| 7,104,129 B2 | 9/2006 | Nasiri et al. | |
| 7,121,141 B2 | 10/2006 | McNeil | |
| 7,154,477 B1 | 12/2006 | Hotelling et al. | |
| 7,155,975 B2 | 1/2007 | Mitani et al. | |
| 7,158,118 B2 | 1/2007 | Liberty | |
| 7,159,442 B1 * | 1/2007 | Jean | 73/12.01 |
| 7,168,317 B2 | 1/2007 | Chen | |
| 7,180,500 B2 | 2/2007 | Marvit et al. | |
| 7,196,404 B2 | 3/2007 | Schirmer et al. | |
| 7,210,351 B2 | 5/2007 | Lo et al. | |
| 7,222,533 B2 | 5/2007 | Mao et al. | |
| 7,236,156 B2 | 6/2007 | Liberty et al. | |
| 7,237,437 B1 | 7/2007 | Fedora | |
| 7,239,301 B2 | 7/2007 | Liberty et al. | |
| 7,240,552 B2 | 7/2007 | Acar et al. | |
| 7,243,561 B2 | 7/2007 | Ishigami et al. | |
| 7,247,246 B2 | 7/2007 | Nasiri et al. | |
| 7,250,112 B2 | 7/2007 | Nasiri et al. | |
| 7,258,011 B2 | 8/2007 | Nasiri et al. | |
| 7,260,789 B2 | 8/2007 | Hunleth et al. | |
| 7,262,760 B2 | 8/2007 | Liberty | |
| 7,284,430 B2 | 10/2007 | Acar et al. | |
| 7,289,898 B2 | 10/2007 | Hong et al. | |
| 7,290,435 B2 | 11/2007 | Seeger et al. | |
| 7,299,695 B2 | 11/2007 | Tanaka et al. | |
| 7,325,454 B2 | 2/2008 | Saito et al. | |
| 7,331,212 B2 | 2/2008 | Manlove et al. | |
| 7,333,087 B2 | 2/2008 | Soh et al. | |
| 7,352,567 B2 | 4/2008 | Hotelling et al. | |
| 7,377,167 B2 | 5/2008 | Acar et al. | |
| 7,386,806 B2 | 6/2008 | Wroblewski | |
| 7,395,181 B2 | 7/2008 | Foxlin | |
| 7,414,611 B2 | 8/2008 | Liberty | |
| 7,424,213 B2 | 9/2008 | Imada | |
| 7,437,931 B2 | 10/2008 | Dwyer et al. | |
| 7,442,570 B2 | 10/2008 | Nasiri et al. | |
| 7,458,263 B2 | 12/2008 | Nasiri et al. | |
| 7,508,384 B2 | 3/2009 | Zhang et al. | |
| 7,522,947 B2 | 4/2009 | Tsuda | |
| 7,533,569 B2 | 5/2009 | Sheynblat | |
| 7,549,335 B2 | 6/2009 | Inoue et al. | |
| 7,552,636 B2 | 6/2009 | Datskos | |
| 7,617,728 B2 | 11/2009 | Cardarelli | |
| 7,621,183 B2 | 11/2009 | Seeger et al. | |
| 7,677,099 B2 | 3/2010 | Nasiri et al. | |
| 7,677,100 B2 | 3/2010 | Konaka | |
| 7,779,689 B2 | 8/2010 | Li et al. | |
| 7,783,392 B2 | 8/2010 | Oikawa | |
| 7,784,344 B2 | 8/2010 | Pavelescu et al. | |
| 2002/0189351 A1 | 12/2002 | Reeds et al. | |
| 2003/0159511 A1 * | 8/2003 | Zarabadi et al. | 73/514.02 |
| 2004/0066981 A1 | 4/2004 | Li et al. | |
| 2004/0160525 A1 | 8/2004 | Kingetsu et al. | |
| 2004/0179108 A1 | 9/2004 | Sorek et al. | |
| 2005/0066728 A1 | 3/2005 | Chojnacki | |
| 2005/0110778 A1 | 5/2005 | Ben Ayed | |
| 2005/0212751 A1 | 9/2005 | Marvit et al. | |
| 2006/0017837 A1 | 1/2006 | Sorek et al. | |
| 2006/0032308 A1 | 2/2006 | Acar et al. | |
| 2006/0033823 A1 | 2/2006 | Okamura | |
| 2006/0061545 A1 | 3/2006 | Hughes et al. | |
| 2006/0115297 A1 | 6/2006 | Nakamaru | |
| 2006/0119710 A1 | 6/2006 | Ben-Ezra et al. | |
| 2006/0139327 A1 | 6/2006 | Dawson et al. | |
| 2006/0164382 A1 | 7/2006 | Kulas et al. | |
| 2006/0164385 A1 | 7/2006 | Smith et al. | |
| 2006/0185502 A1 | 8/2006 | Nishitani et al. | |
| 2006/0187308 A1 | 8/2006 | Lim et al. | |
| 2006/0251410 A1 | 11/2006 | Trutna, Jr. | |
| 2007/0035630 A1 | 2/2007 | Lindenstruth et al. | |
| 2007/0063985 A1 | 3/2007 | Yamazaki et al. | |
| 2007/0113207 A1 | 5/2007 | Gritton | |
| 2007/0146325 A1 | 6/2007 | Poston et al. | |

| | | |
|---|---|---|
| 2007/0167199 A1 | 7/2007 | Kang |
| 2007/0176898 A1 | 8/2007 | Suh |
| 2008/0009348 A1 | 1/2008 | Zalewski et al. |
| 2008/0088602 A1 | 4/2008 | Hotelling |
| 2008/0098315 A1 | 4/2008 | Chou et al. |
| 2008/0134784 A1 | 6/2008 | Jeng et al. |
| 2008/0158154 A1 | 7/2008 | Liberty et al. |
| 2008/0204566 A1 | 8/2008 | Yamazaki et al. |
| 2008/0314147 A1* | 12/2008 | Nasiri et al. ............... 73/514.32 |
| 2009/0088204 A1 | 4/2009 | Culbert et al. |
| 2010/0013814 A1 | 1/2010 | Jarczyk |

OTHER PUBLICATIONS

Singh, Amit, "The Apple Motion Sensor as a Human Interface Device," www.kernelthread.com, 1994-2006.

Cho, et al., Dynamics of Tilt-based Browsing on Mobile Devices. CHI 2007, Apr. 28-May 3, 2007, San Jose, California, USA., pp. 1947-1952.

* cited by examiner

VERTICALLY INTEGRATED 3-AXIS MEMS ANGULAR ACCELEROMETER WITH INTEGRATED ELECTRONICS

FIELD OF THE INVENTION

The present invention relates generally to accelerometers and more specifically to multi axis accelerometers that sense angular (rotational) accelerations.

BACKGROUND OF THE INVENTION

Angular or rotational accelerometers are used to measure rotational acceleration about a specific axis. Rotational accelerometers have many applications such as vehicle rollover event prevention, rotational vibration suppression for hard disk drives, airbag deployment and so on. With the advances in MEMS technology various rotational accelerometers that can be fabricated using silicon micromachining techniques have been proposed in U.S. Pat. No. 5,251,484, "Rotational accelerometer," Oct. 12, 1993; U.S. Pat. No. 6,718,826, "Balanced angular accelerometer," Apr. 13, 2004; U.S. Pat. No. 5,872,313, Temperature-compensated surface micromachined angular rate sensor," Feb. 16, 1999; U.S. Pat. No. 6,257,062, "Angular accelerometer," Jul. 10, 2001. In these applications surface micromachining used to fabricate the moving proof masses. Surface micromachining imposes limits on the structures. For example, the proof mass thickness is limited to the thickness of the deposited films. Surface micromachining also suffers for the stiction problem as a result of sacrificial etching and wet release processes. Therefore proof masses fabricated using this method requires additional supports around the perimeter of the proof mass to reduce stiction and to increase the stability. This results in relatively more complicated devices and stringent requirements for the fabrication of additional springs that would not disturb the operation of the rotational accelerometer. On the other hand bulk micromachining overcomes most of the problems associated with the surface micromachining. U.S. Pat. No. 7,077,007, "Deep reactive ion etching process and microelectromechanical devices formed thereby," Jul. 18, 1006 describes DRIE etching for bulk micromachined angular accelerometers.

The sensing methods used in MEMS accelerometer vary. Capacitive sensors provide high performance as well as low cost. Because of these features it became the method of choice for most of the consumer market applications. But to be able to obtain high sensitivity and low noise floor the parasitic capacitances need to be reduced or eliminated. This can be achieved by integrating MEMS and electronics. The accelerometers described in the above-identified patents are not integrated with the detection electronics. In a typical system, the detection electronics needs to be connected to the MEMS substrate through wire bonding. Accordingly, this system suffers from increased parasitics and is susceptible to noise and coupling of unwanted signals.

Therefore, there is a need for rotational accelerometers that are fabricated using bulk micromachining methods and integrated with electronics. There is also need for multi-axis accelerometers that are insensitive to linear accelerations. The present invention addresses such needs.

SUMMARY OF THE INVENTION

Sensors for measuring angular acceleration about three mutually orthogonal axes, X,Y, Z or about the combination of these axes are disclosed. The angular accelerometers are fabricated by bulk micromachining and integrated with electronics. The sensor comprises a sensor subassembly. The sensor subassembly further comprises a base which is substantially parallel to the X-Y sensing plane; a proof mass disposed in the X-Y sensing plane and constrained to move substantially about the X, and/or Y, and/or Z, by at least one linkage and is responsive to angular accelerations about the X, and/or Y, and/or Z directions. Finally, the sensor includes at least one electrode at the base plate or perpendicular to the base plate and at least one transducer for each sensing direction of the sensor subassembly responsive to the angular acceleration. Multi-axis detection is enabled by adjusting a configuration of flexures and electrodes.

Two structures or more can be used per axis to enable full bridge measurements to further reduce the susceptibility to power supply changes, cross axis coupling and the complexity of the sense electronics.

DETAILED DESCRIPTION

The present invention relates generally to motion sensing devices and more specifically to angular accelerometers utilized in integrated circuits. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention relates to the accelerometers that are fabricated using silicon micromachining methods that have been described in U.S. Pat. No. 7,104,129, entitled "Vertically Integrated MEMS Structure with Electronics in a Hermetically Sealed Cavity,", issued Sep. 12, 2006, and assigned to the assignee of the present application; and U.S. Pat. No. 7,247,246, entitled "Vertical Integration of a MEMS Structure with Electronics in a Hermetically Sealed Cavity," issued Jul. 24, 2007, and assigned to the assignee of the present application, both of which are incorporated by reference in their entirety herein. The assembly approach (Nasiri fabrication process) described in the said patents provides a cost effective means to simultaneously protect the movable sensing element and to integrate the low noise electronics. The electronic circuitry is fabricated on a dedicated electronics silicon substrate. The MEMS assembly then bonded on the electronic or sense substrate using a metal bonding technique using a low temperature process that does not damage or compromise the electronic circuitry. A plurality of transducers is assembled in this manner at the wafer level where hundreds to thousands are produced simultaneously. A small size form factor is achieved by the vertical integration of the sensing element with its sensing circuit. Other patents that are relevant for accelerometer fabrication are: U.S. Pat. No. 6,939,473 "Method of making an X-Y axis dual-mass tuning fork gyroscope with vertically integrated electronics and wafer-scale hermetic packaging"; U.S. Pat. No. 7,258,011 "Multiple axis accelerometer"; and U.S. Pat. No. 7,250,353 "Method and system of releasing a MEMS structure" assigned to the assignee of the present application.

Figure 1A:
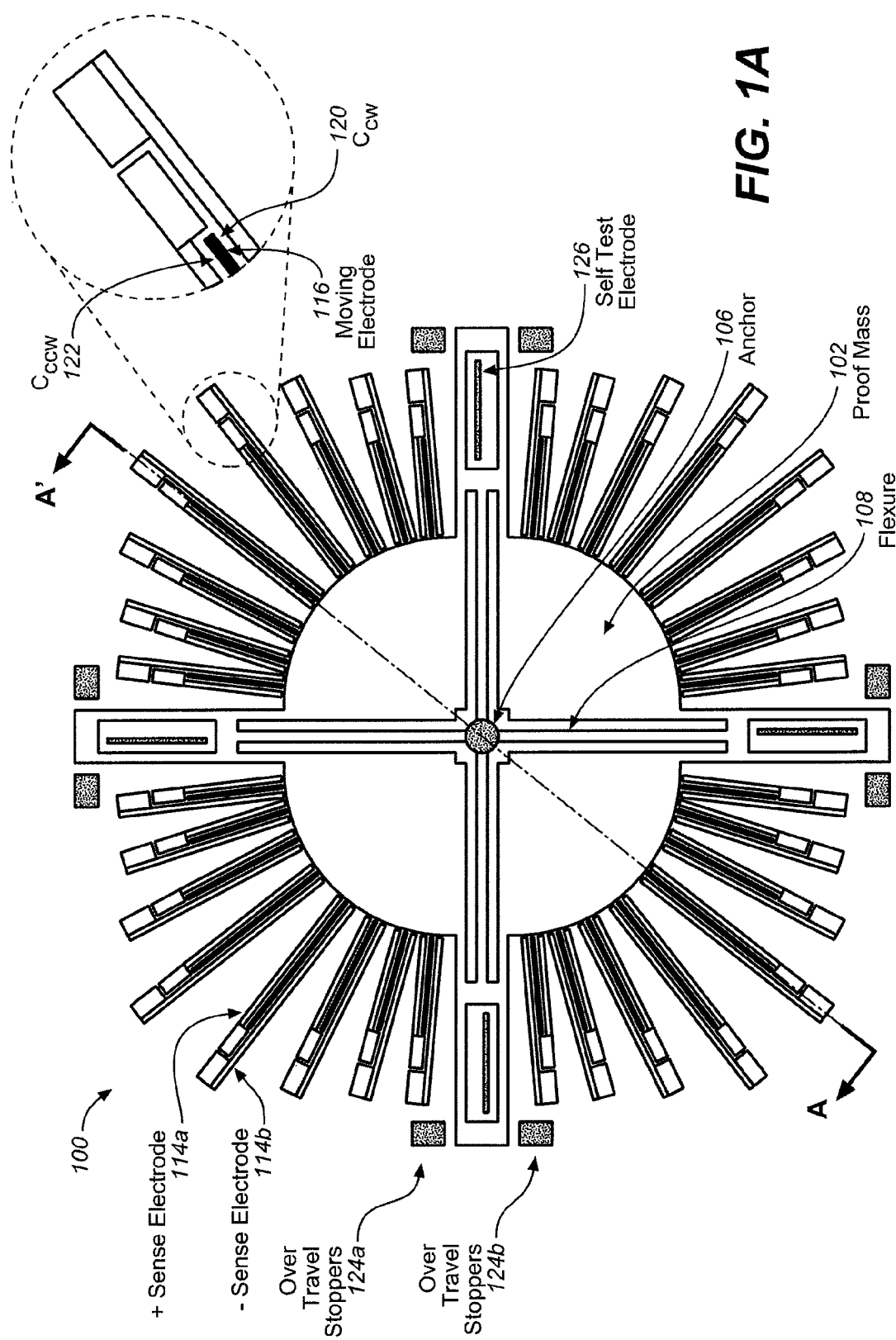
FIG. 1A shows top view of a portion of a MEMS assembly according to an embodiment.
Figure 1B:
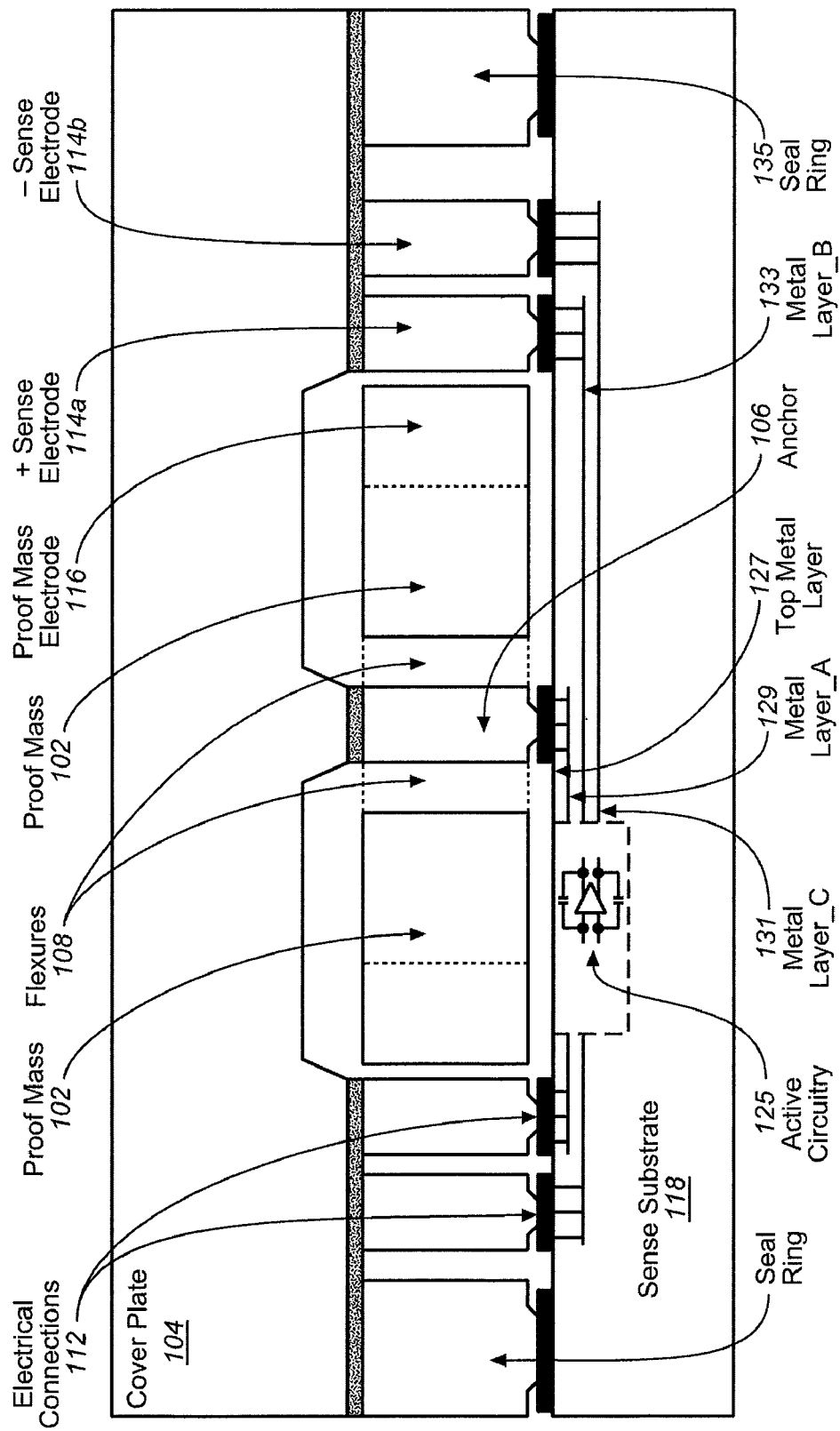
FIG. 1B shows the cross section AA' of the angular accelerometer in FIG. 1A.

FIGS. 1A and 1B show a rotational accelerometer 100 and the cross section AA of the accelerator 100, respectively. As is seen, a proof mass 102 is attached to the cover plate 104 at a single anchor 106 through flexural springs 108. The anchor 106 is at the center of the proof mass 102. The proof mass 102 is movable. It is constraint to rotate along Z axis which is perpendicular to the proof mass 102. The springs 108 can be made in any shape to adjust the spring constant. The anchor 106 is attached to the cover plate 104 utilizing a bonding process such as fusion bonding. The anchor 106 is also connected to the sense substrate 118 through an electrical connection 112.

The electrical connection 112 can be made under the anchor 106 as described in published U.S. Published Application No. 2006/0208326, entitled "Method of fabrication of al/ge bonding in a wafer packaging environment and a product produced therefrom" which is also assigned to the assignee of the present application. The method described in that published patent application allows making mechanical and electrical connections on the same anchor. The single anchoring of the proof mass 102 reduces the stresses that may be induced by the package warpage. The sense electrodes 114a and 114b are coupled to sensor substrate 118 and do not move with respect to proof mass. When the proof mass 102 is subjected to an angular acceleration about the axis (Z-axis) perpendicular to the plane, the forces acting on the proof mass 102 rotates it about the anchor 106. The rotation of the proof mass 102 is sensed capacitively. The moving electrodes 116 extending from the proof mass 102 form capacitors with the sense electrodes 114.

The sense electrodes 114a-114b are bonded to the cover plate 104 and electrically connected to the sense substrate 118. There are two sense electrodes 114a-114b per each moving electrode 116 on the proof mass 102 forming two capacitors. The value of one of these capacitors increases, whereas the value of other one decreases as the proof mass 102 rotates. The capacitors are labeled $C_{CW}$ 120 and $C_{CCW}$ 122 as shown in FIG. 1A.

$C_{CW}$ 120 increases if the proof mass 102 rotates in clockwise direction and $C_{CCW}$ 122 increases if the proof mass 102 rotates in the counter-clockwise direction about the axis perpendicular to the sense substrate. $C_{CW}$ 120 and $C_{CCW}$ 122 allow for the differential detection of the proof mass 102 rotation and hence provide an indication of the angular acceleration.

Referring to FIG. 1A, the accelerometer 100 has features to provide reliable operation. For example, it has motion stoppers 124a-124b about Z rotation to restrict the motion for excessive acceleration. In the directions that are out of plane, its stiffness is high enough to provide mechanical stability. The accelerometer 100 has also self test electrodes 126 to actuate the proof mass 102 for test purposes.

As before mentioned, FIG. 1B shows the cross section of the angular accelerometer shown in FIG. 1A. Other MEMS devices such as accelerometers and gyros have been disclosed previously by the assignee of the present application (U.S. Pat. No. 7,258,011, "Multiple axis accelerometer"; U.S. Pat. No. 6,939,473, "Method of making an X-Y axis dual-mass tuning fork gyroscope with vertically integrated electronics and wafer-scale hermetic packaging"; U.S. Pat. No. 6,892,575, "X-Y axis dual-mass tuning fork gyroscope with vertically integrated electronics and wafer-scale hermetic packaging"). A similar fabrication platform described in these patents may also be used for the angular accelerometers shown in FIG. 1B.

The fabrication process starts with the manufacturing of the cover plate 104. First alignment marks are patterned on top of the cap or cover wafer. These marks will be later used to align the cover wafer to the sense substrate. Then the cover plate 104 is oxidized preferably using thermal oxidation to form an oxide layer. The preferable thickness of the oxide is between 0.5 and 1 micron. The oxide is patterned using lithographic methods to define the cavities in the cover plate 104.

The cavity depth can be further increased by etching the exposed silicon surfaces in the cover plate 104. But, if the structures in the actuator layer are not supposed to move more than the oxide thickness in vertical direction or there are no difficulties associated with having a cover in the close proximity of the moving parts, the silicon etch step may be skipped.

Then, the cover plate 104 is cleaned and bonded to another low total thickness variation wafer. The second wafer will form an actuator layer after thinning it down to preferably 40 microns. The actuator layer includes the proof mass 102 the sense electrodes 114a and 114b and the flexure springs 108 any other structures such as self test electrodes and overtravel stoppers. The next step in the process is the formation of the stand offs. An etch, such as an KOH etch, is suitable for this step. The height of the stand offs determine the vertical separation between actuator layer and the sense substrate 118. If there are electrodes on the sense substrate 118, this gap also determines the sensing capacitor gaps. Then, a germanium (Ge) layer is deposited and patterned. In the next step, elements of the rotational accelerometer are defined lithographically and etched using DRIE in the actuator layer. In the final step, the actuator layer is bonded a sense substrate using eutectic bonding.

Accordingly, as is seen in FIG. 1B, the active areas of the sense substrate 118 include regions that will make electrical contact with an actuator layer where the angular accelerometer 100 is defined, as well as circuitry 125 for sensing output signals from the angular accelerometer 100. Such circuitry 125 is preferably conventional CMOS circuitry. The top layer 127 of metal deposited in the conventional CMOS process is suitable for use as a bond metal. This upper layer 127 of metal defines bond pads for the connections to the sense electrodes 114a and 114b and the proof masses 102. One can also put electrodes on the top layer 127 to measure out of plane motion of the accelerometer in the case X and Y angular accelerometer.

The connections to the proof masses 102 and sense electrodes 114a and 114b can be routed in the lower CMOS metals 129, 131 and 133 where metals can cross over each other in different layers. This allows for complicated routing schemes to be utilized for connecting the MEMS device to the active electronics. Another advantage of having the sense substrate 118 in the close proximity of the angular accelerometer is that the connections between the MEMS device and sense electronics can be made very short. This reduces the parasitic coupling to ground, cross coupling between the wires and EMI coupling.

The above-described fabrication process produces hermetically sealed sensors for example utilizing sealing rings 135. The sense substrate 118 is preferably attached to the actuator layer via a metal-to-metal bond, which can be made hermetic. Likewise, the actuator layer is preferably attached to cover plate 104 by a fusion bond, which can also be made hermetic. As a result, the entire assembly of sense substrate 118, actuator layer and cover plate 104 can provide a hermetic barrier between angular accelerometer elements and an ambient environment. The pressure in the cavity can be adjusted during the eutectic bonding process. This allows the quality factor of the angular accelerometer to be controlled for better noise performance and dynamic response.

The above-described fabrication process also allows combining various inertial measurement devices on the same substrate. The angular accelerometers described in this patent can be easily integrated with linear accelerometers as well as low cost gyroscopes.

Figure 1C:
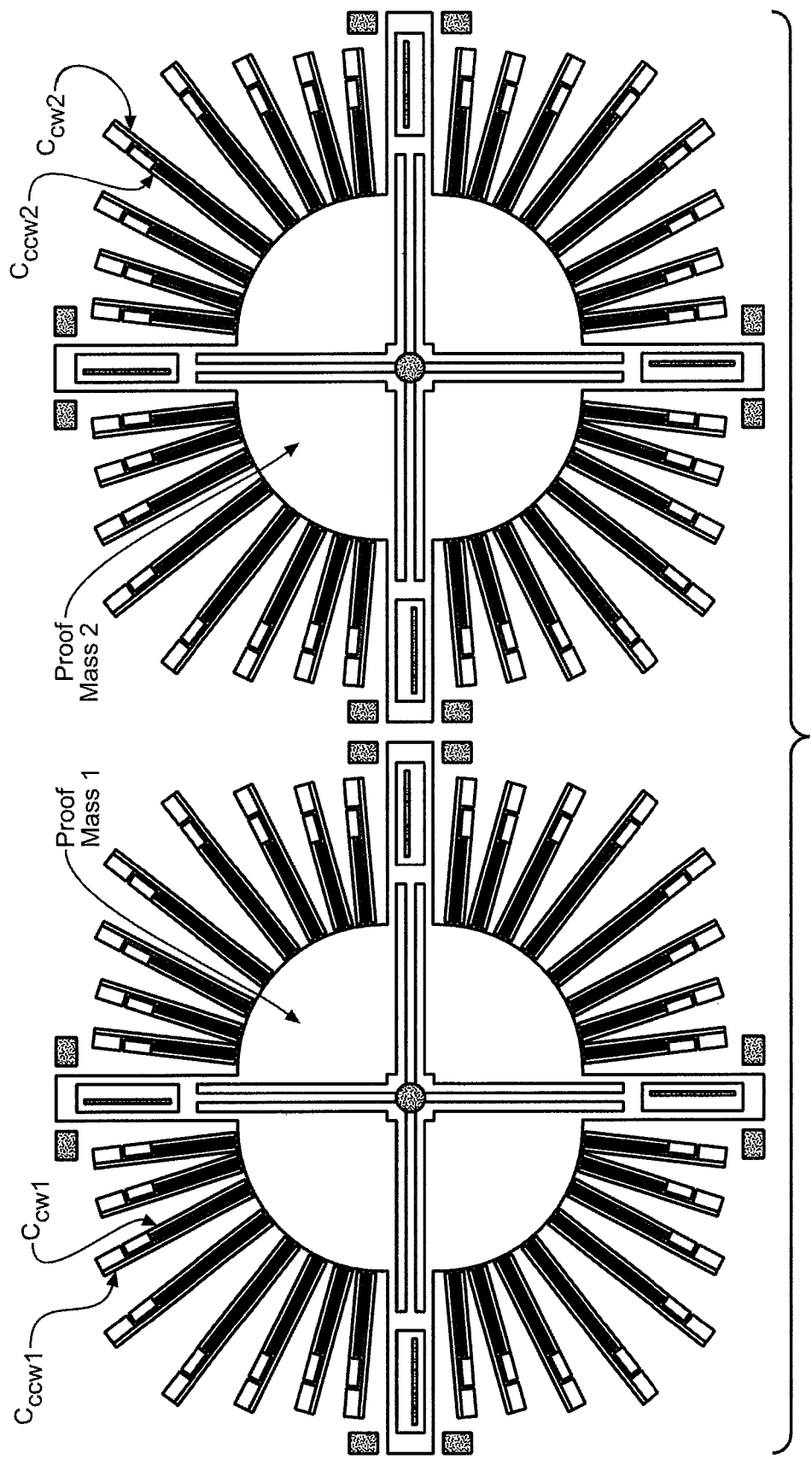
FIG. 1C shows an angular accelerometer comprising two proof masses.

One can use two of the structures shown in FIG. 1A to provide four changing capacitances as shown in FIG. 1C. Note that, in this case the proof masses are electrically isolated. This allows for the detection of a capacitance change utilizing a full bridge configuration in so doing common mode signals are eliminated and allows using simpler electronics can be utilized. The capacitance change of the accelerometers described above can be detected by various circuits.

Figure 1D:
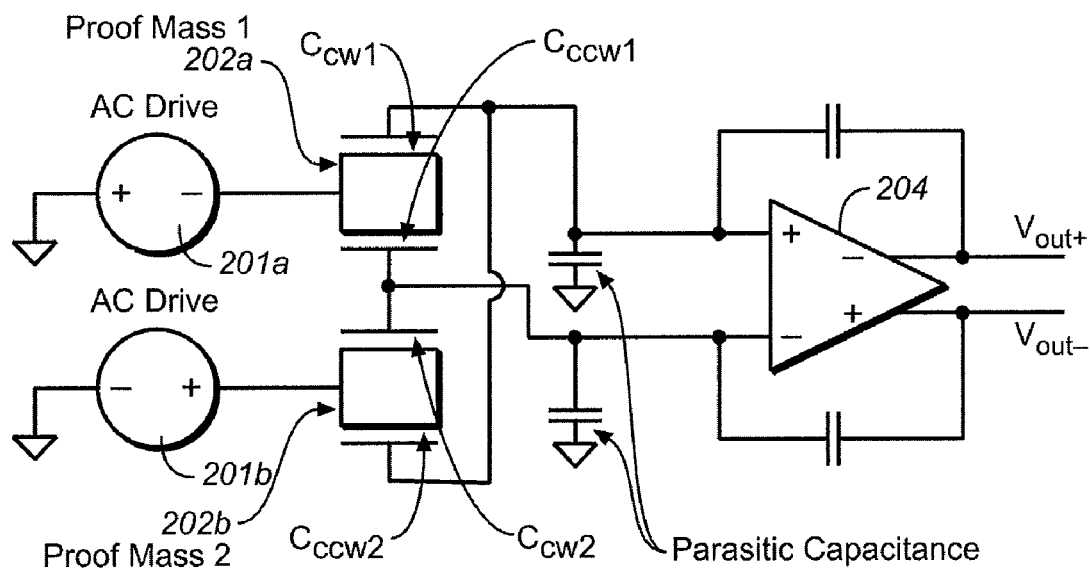
FIG. 1D shows the detection electronics for the accelerometer shown in FIG. 1C.

An example of circuitry for detecting the capacitance change due to rotational acceleration is shown in FIG. 1D where a full bridge configuration is utilized. As is seen, AC voltages 201a, 201b, which are 180 degree out of phase with respect to each other are applied to the proof masses 202a and 202b. The output voltage is detected off the sense electrodes utilizing an operational amplifier 204. When there is no acceleration, the bridge is in balanced and the output voltage is zero. Angular acceleration of the proof masses 202a and 202b disturbs the balance and gives rise to an AC voltage at the operational amplifier 204 output which amplitude is proportional to the acceleration. The operational amplifier 204 output later can be demodulated to obtain a signal directly proportional to the acceleration.

In this embodiment, a full bridge circuit is described but one of ordinary skill in the art readily recognizes other means of capacitive detection such as pseudo bridge, half bridge can also be employed. Alternatively, one can also drive the sense electrodes and monitor the proof mass motion and by observing the output voltages of the op-amp.

Figure 2A:
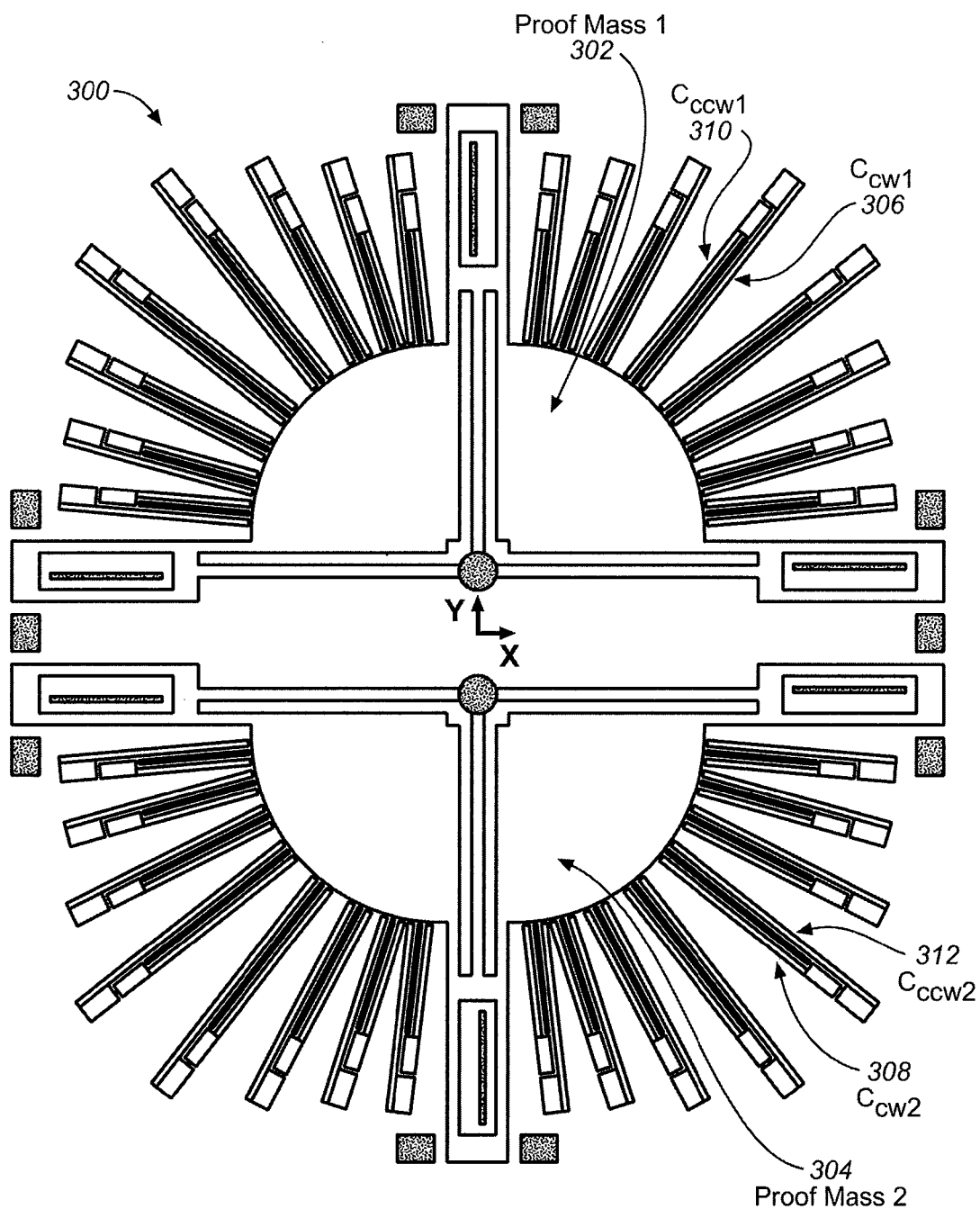
FIG. 2A illustrates an angular accelerometer composed of two proof masses.
Figure 2B:
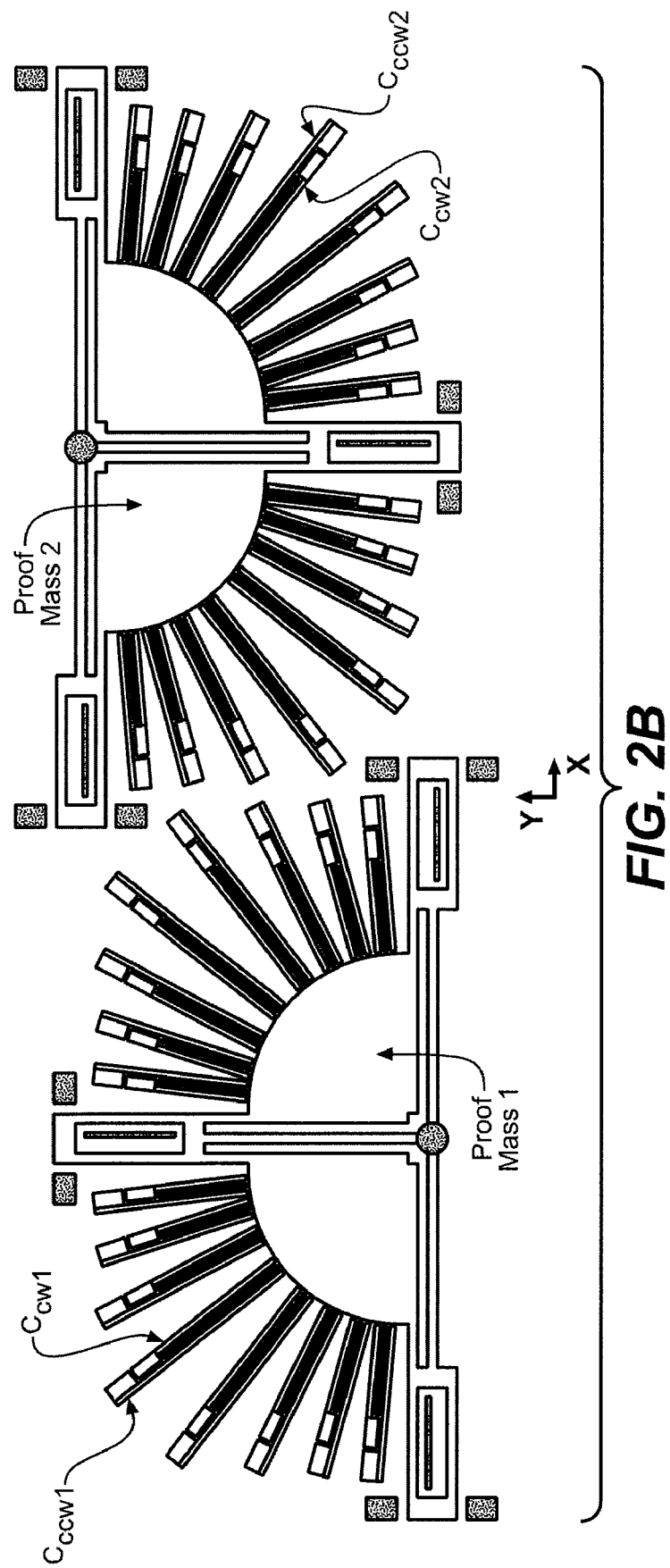
FIG. 2B shows an alternative arrangement of proof masses shown in FIG. 2A.

In an alternative configuration to obtain full bridge configuration, instead of using the full circular proof mass of FIG. 1A, one can use only half of the proof mass 302-304. This reduces the area usage as shown in FIG. 2A at the expense of sensitivity. Each proof mass 302-304 is connected to a single anchor point by three or more flexures. In this case $C_{CW1}$ 306 and $C_{CW2}$ 308 increase with the clock wise rotation of the proof mass 302 and 304 whereas $C_{CCW1}$ 310 and $C_{CCW2}$ 312 decrease. The change in the capacitance can be detected in a full bridge configuration as shown in FIG. 1D. FIG. 2B shows an alternative placement for the proof masses of FIG. 2A.

Figure 3A:
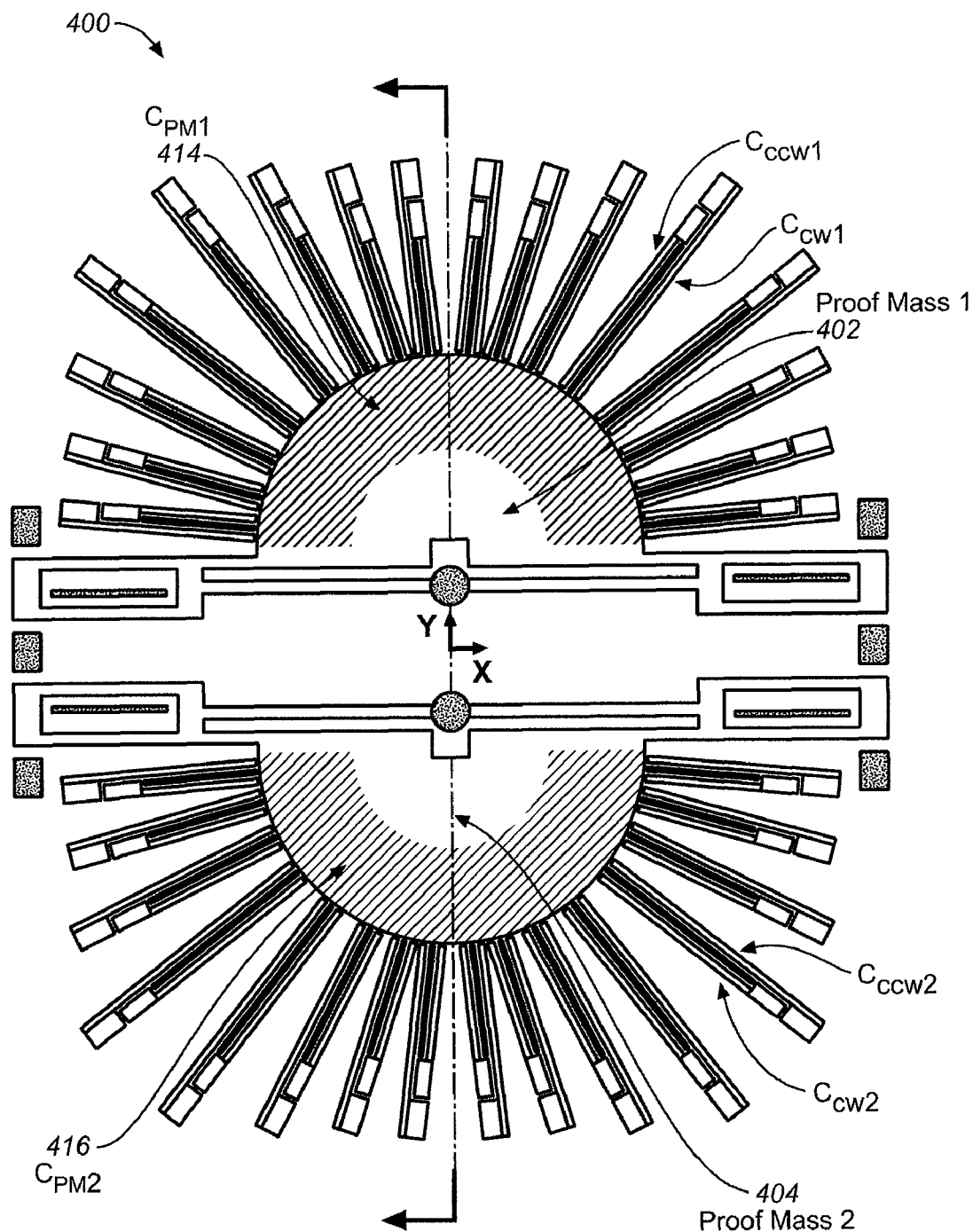
FIG. 3A illustrates multi-axis accelerometer (X and Z rotational accelerometer, Z linear accelerometer).

In another configuration as shown in FIG. 3A, the flexures can be configured such that the proof masses 402' and 404' become sensitive to rotation about another axis (X) in addition to the first rotational axis which is Z in this case. The Z-rotation detection method is same as the scheme described in FIG. 2. However, attaching the proof masses 402 and 404 with flexures along the edge of the half circle makes them sensitive to the rotations about the axis parallel to that edge. For Z axis rotation, the flexures simply flex allowing the rotation of the proof mass 402 and 404. For X axis rotation, the flexures make a torsional motion. The out of plane motion of the proof masses 402 and 404 can be measured by parallel plate capacitors between the proof masses 402 and 404 and the sense substrate.

Figure 3B:
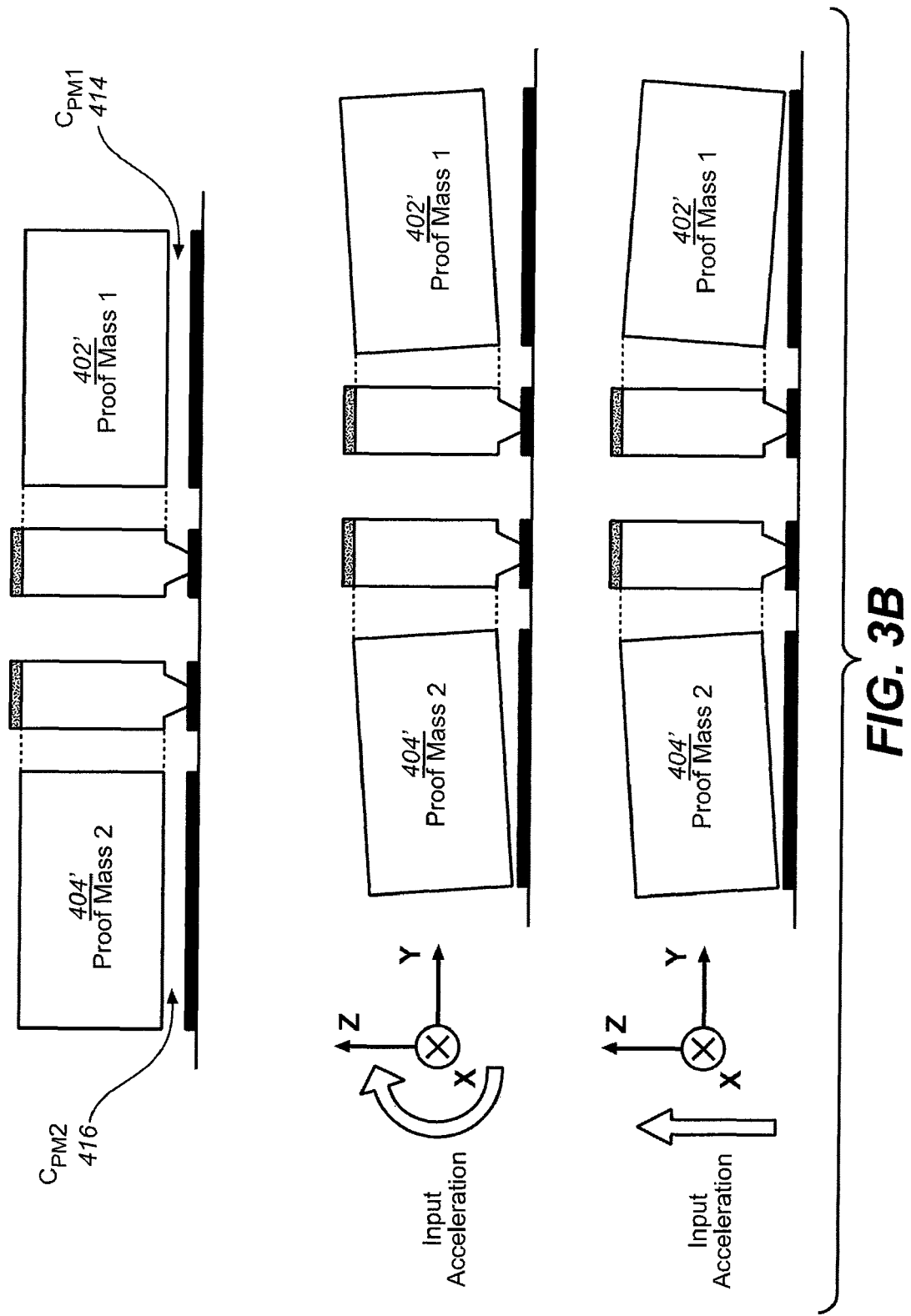
FIG. 3B illustrates the cross section of the accelerometer shown in FIG. 3A and the proof mass deflection as a function of input rotational X and linear Z acceleration.

In FIG. 3A, the capacitance between the proof mass 402 and the substrate is $C_{PM1}$ 414 and the other capacitor is $C_{PM2}$ 416 which is between the proof mass 404 and sense substrate. The rotational acceleration about X moves one of the proof masses away from the substrate and the other one closer to the substrate. This increases the capacitance $C_{PM2}$ 416' and reduces the $C_{PM1}$ 414' according to FIG. 3B. These two capacitors can be used for differential detection of the rotation. Again, by replicating the structure shown in FIG. 3A, one can obtain four capacitances for X axis rotation to implement full bridge detection. However, for Z rotation, one structure as shown in FIG. 3A is enough to implement full bridge configuration, but two structure configuration also improves Z sensitivity. In addition to rotational accelerations, these accelerometers can be used to measure linear acceleration along Z direction as shown in FIG. 3B. In this case, the sum of the $C_{PM1}$ 414' and $C_{PM2}$ 416' needs to be detected, rather than the difference of them which is the case for measuring rotational acceleration about the X axis.

Figure 3C:
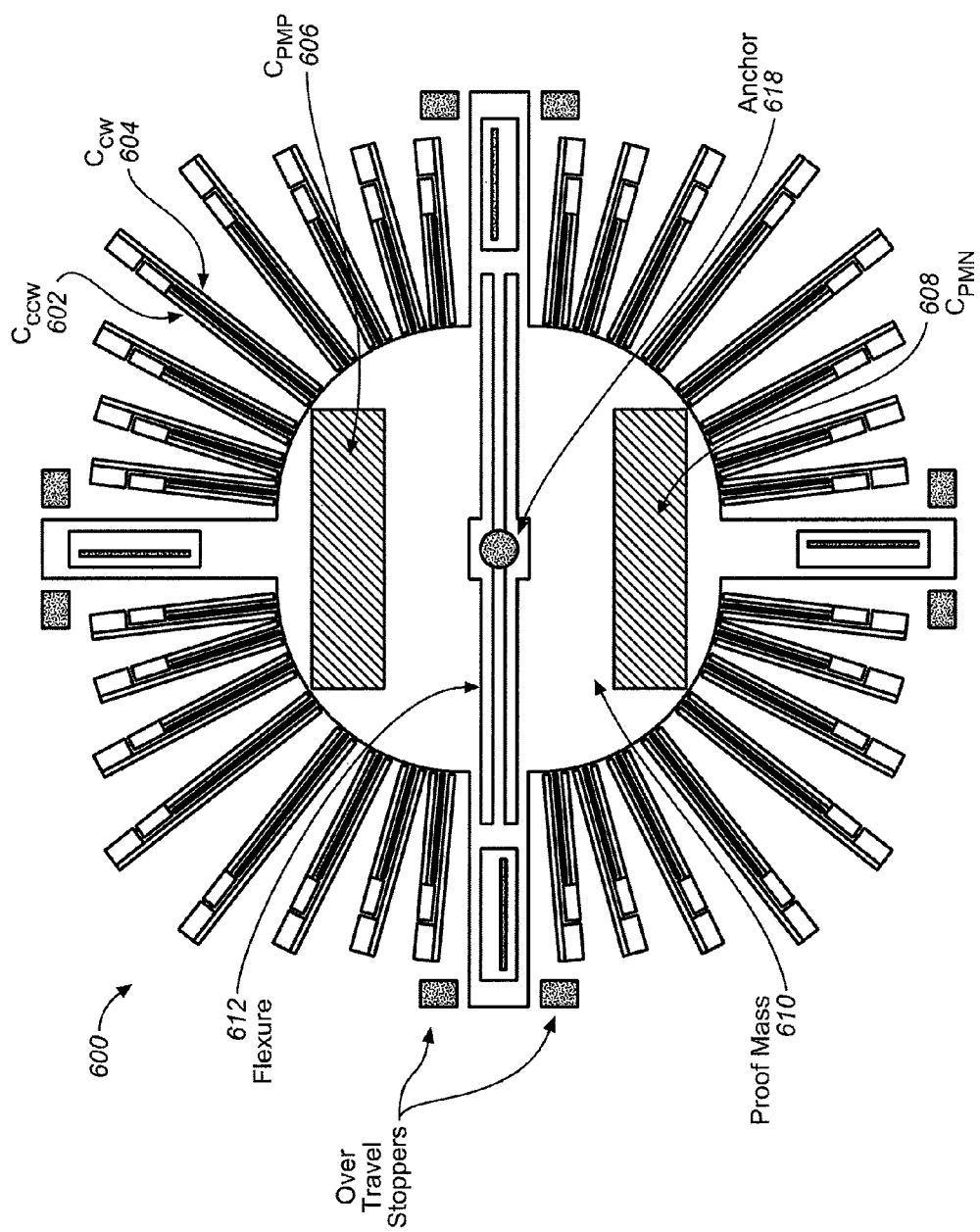
FIG. 3C illustrates one proof mass that is sensitive to rotational X and Z accelerations but insensitive to linear accelerations.

Alternatively, one can use the structure shown in FIG. 3C for X and Z rotation where X direction is in plane and parallel to the flexure 612 and Z direction is perpendicular to the lateral plane. In this structure, the two proof masses (402, 404) of FIG. 3A are combined to form a single proof mass 610. The proof mass 610 is constraint to rotate about the anchor 618 and about the flexure 612. Electrodes 602 and 604 are sensitive to rotations about Z. The electrodes 606 and 608 which are between the sense substrate and the proof mass 610 are sensitive to rotations about X. However, for this structure linear acceleration along Z direction will not result in any capacitance change on $C_{PMP}$ and $C_{PMN}$ therefore this accelerometer is insensitive to linear acceleration along Z. Full bridge configuration will require two of these structures.

Figure 4A:
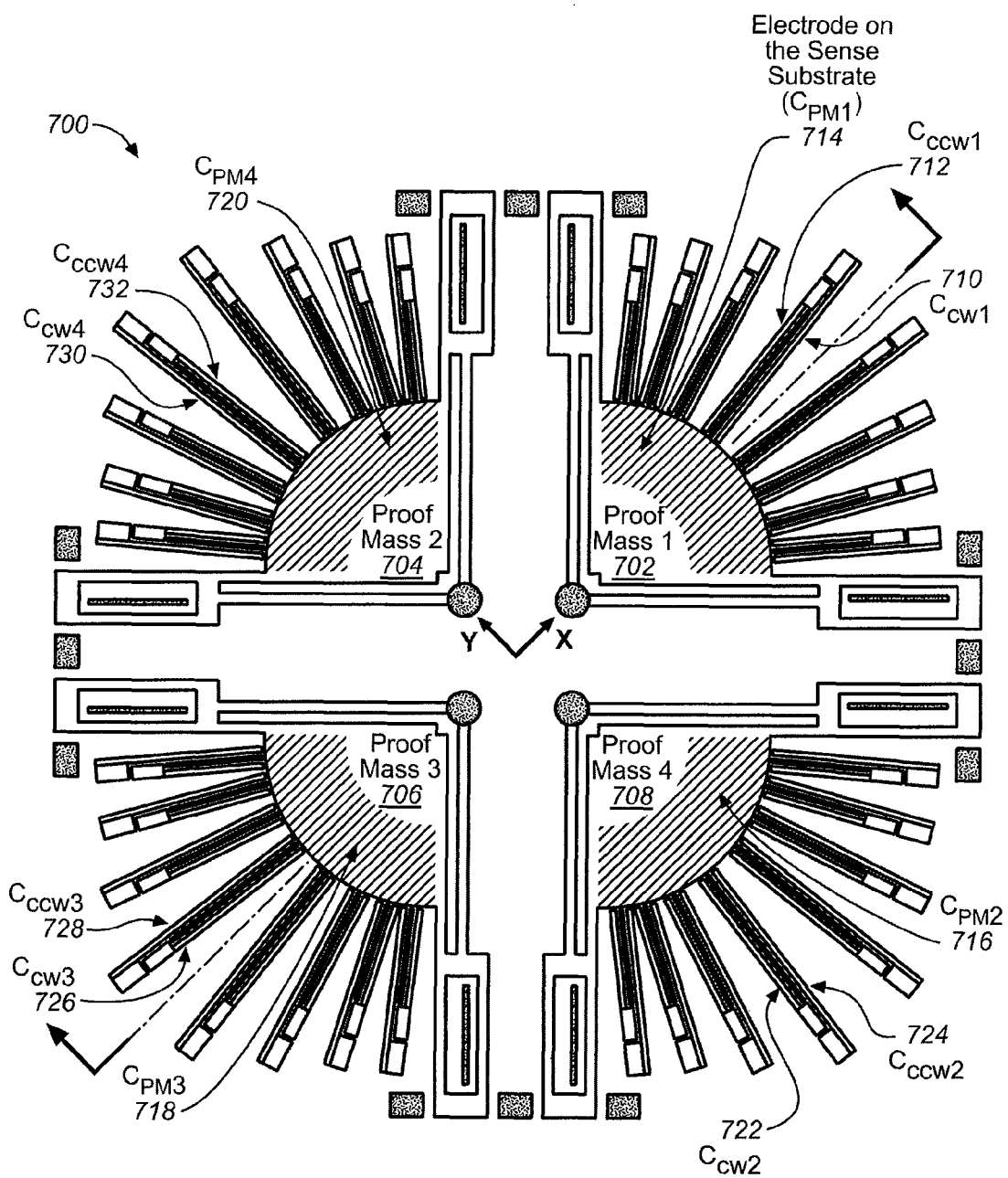
FIG. 4A illustrates four axis accelerometer (X, Y and Z rotational, Z linear accelerometer).
Figure 4B:
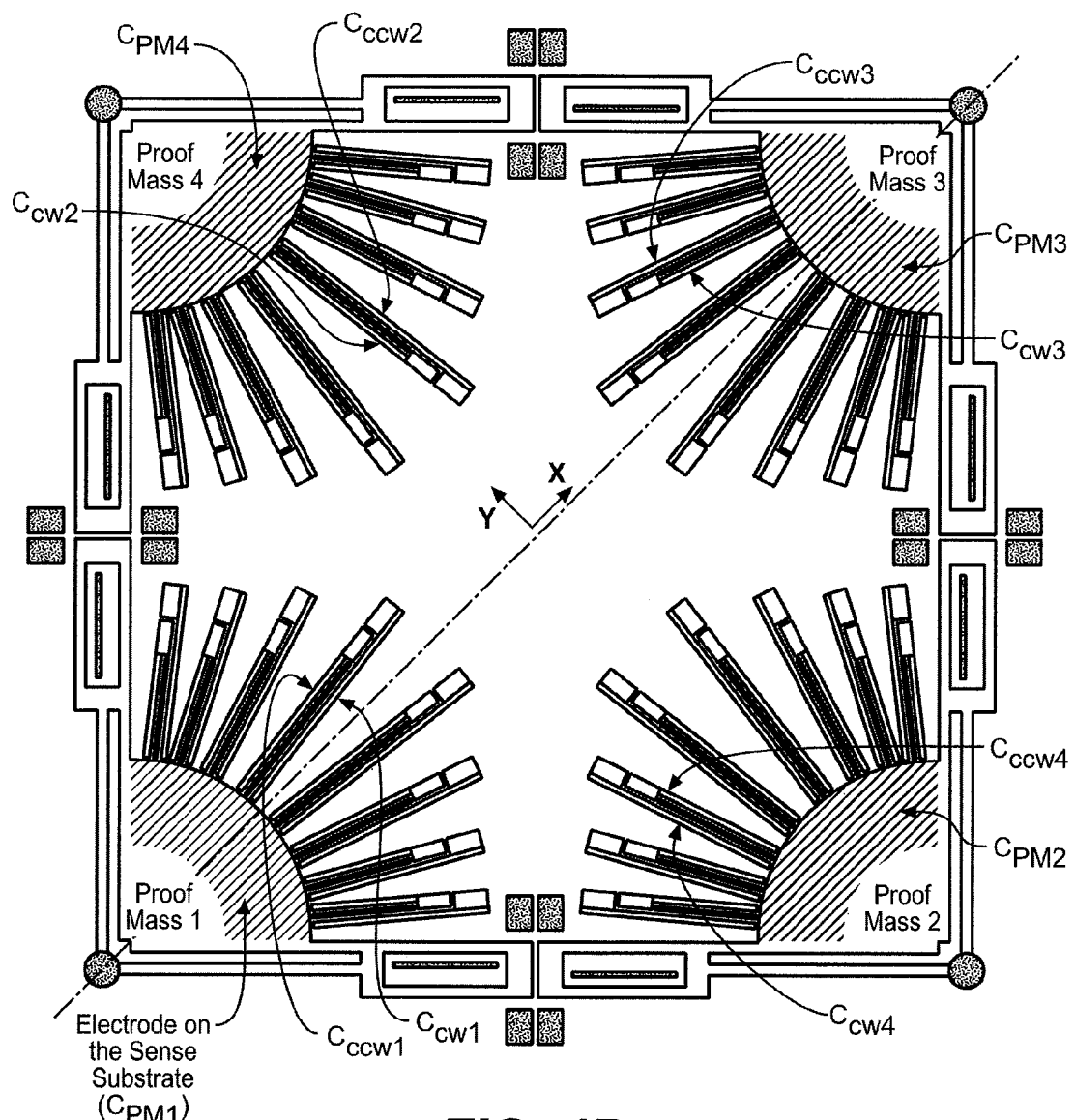
FIG. 4B illustrates an alternative arrangement of proof masses shown in FIG. 4A.
Figure 4C:
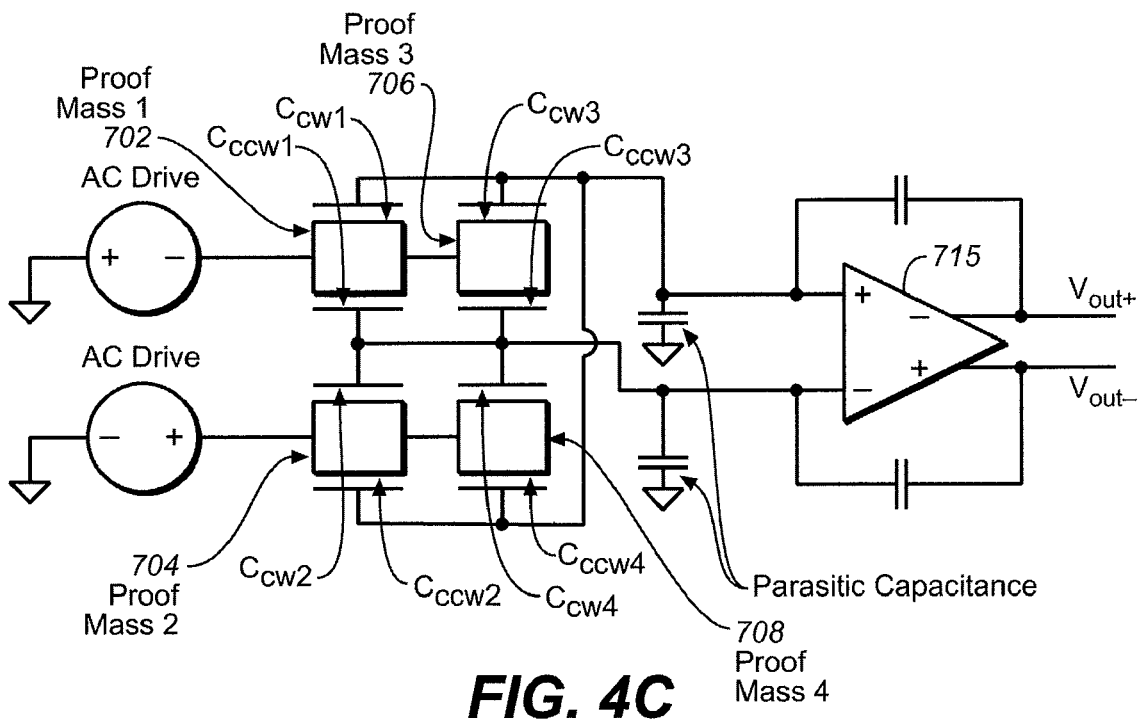
FIG. 4C shows the detection electronics for the Z-axis angular accelerometers shown in FIGS. 4A and 4B.

FIG. 4A shows a three axis rotational accelerometer. There are four proof masses 702, 704, 706 and 708. The Z rotation is detected through $C_{CW1}$ 710, $C_{CCW1}$ 712, $C_{CW2}$ 722, $C_{CCW2}$ 724, $C_{CW3}$ 726, $C_{CCW3}$ 728, $C_{CW4}$ 730, and $C_{CCW4}$ 732 capacitors. One can easily construct full bridge configuration for this case as shown in FIG. 4C. Basically, proof mass 702 and 706 are connected in parallel likewise proof mass 704 and 708. The rotations about X and Y are sensed through capacitors $C_{PM2}$ 716, $C_{PM4}$ 720 and, $C_{PM1}$ 714, $C_{PM3}$ 718 respectively. When there is rotation about positive X direction, $C_{PM2}$ 716 increases and $C_{PM4}$ 720 decreases. Since the rotation axis is through the centers of $C_{PM1}$ 714 and $C_{PM3}$ 718 these capacitors do not change. Similarly, for Y axis rotation only $C_{PM1}$ 714 and $C_{PM3}$ 718 change, but $C_{PM2}$ 716 and $C_{PM4}$ 720 remain the same. The accelerometer shown in FIG. 4A also sensitive to Z axis linear accelerations. This acceleration can be detected by sensing the sum of $C_{PM1}$ 714, $C_{PM2}$ 716, $C_{PM3}$ 718 and $C_{PM4}$ 720. In an alternative configuration shown in FIG. 4C, the orientation of the proof masses are changed. Placing the X and Y axis rotation detection sensors away from the center of the device increases the sensitivity.

Figure 5:
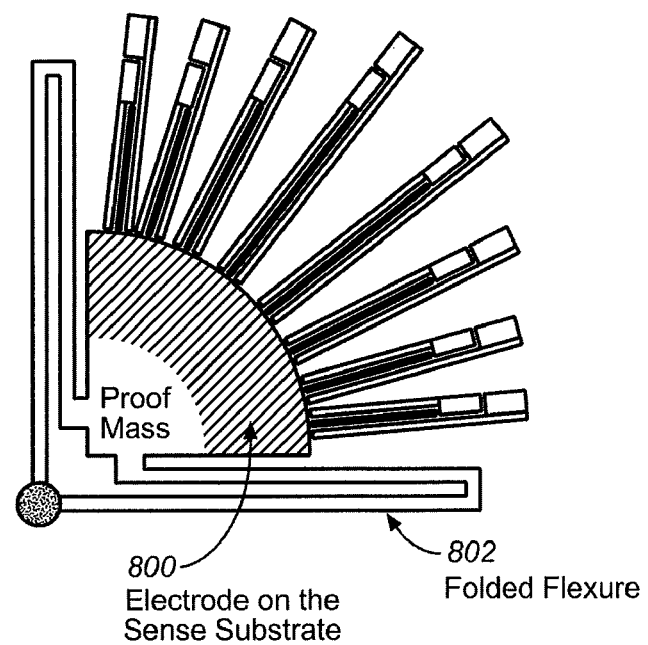
FIG. 5 illustrates one variation of flexures.

FIG. 5 shows an example of a proof mass 800 which includes a different type of flexure 802. One can use folded springs to tailor the spring constant. A folded spring can be connected to the proof mass at the center as shown in FIG. 5. This configuration allows obtaining small spring constants for increased sensitivity in small areas.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A rotational accelerometer comprising:
a cover substrate,
a sense substrate; and
an actuator layer; the actuator layer comprising at least two proof masses constrained to rotate about at least one axis, the at least two proof masses being anchored to the cover and to the sense substrate via at least one flexure, and a plurality of electrodes that can sense rotation about the at least one axis, capacitively, wherein at least one of the two proof masses is constrained to rotate about substantially a Z-direction to measure rotational acceleration about the Z-direction, and is constrained to rotate about substantially a X-direction to measure rotational acceleration about the X-direction and the other of the two proof masses is constrained to rotate about substantially Z-direction to measure rotational acceleration about the Z-direction, and is constrained to rotate about substantially a Y-direction to measure rotational acceleration about the Y-direction.

2. The accelerometer of claim 1 wherein the cover substrate and the sense substrate provide for a hermetically sealed controlled enclosure for the accelerometer.

3. The accelerometer of claim 1 wherein the at least one proof mass is constrained to rotate substantially about a Z-direction to measure rotational acceleration about the Z-direction, and is constrained to rotate about substantially for X-direction to measure rotational acceleration about the X-direction.

4. The accelerometer of claim 1 wherein the at least one proof mass is constrained to rotate substantially about a Z-direction to measure rotational acceleration about the Z-direction, and is constrained to rotate about substantially a Y-direction to measure rotational acceleration about the Y-direction.

5. The accelerometer of claim 1 wherein the plurality of electrodes form a parallel plate capacitance.

6. The accelerometer of claim 1 wherein a full bridge configuration is utilized for capacitive measurement of the at least two proof masses.

7. The accelerometer of claim 1, wherein a full bridge configuration is utilized for capacitance measurement of the at least two proof masses constrained to rotate about a Z-direction.

8. The accelerometer of claim 1, wherein a full bridge configuration is utilized for capacitance measurement of the at least two proof masses constrained to rotate about a Y-direction.

9. The accelerometer of claim 1, wherein a full bridge configuration is utilized for capacitance measurement of the at least two proof masses constrained to rotate about a X-direction.

10. The accelerometer of claim 1 which includes a self-test electrode to actuate the at least one proof mass for test purposes.

11. The accelerometer of claim 1 which includes travel stoppers in at least one of an X or a Y or Z direction.

12. The accelerometer of claim 1 wherein the at least one proof mass is connected electrically to the sense substrate at an anchor.

13. The accelerometer of claim 1 wherein the at least one proof mass is connected electrically to the sense substrate through the at least one flexure.

14. The accelerometer of claim 1 wherein the sense substrate comprises a single crystal silicon wafer.

15. The accelerometer of claim 1 wherein the sense substrate comprises a CMOS integrated circuit.

16. The accelerometer of claim 15 wherein a measurement is provided utilizing a half bridge configuration with a capacitance being in series with a constant capacitance.

17. The accelerometer of claim 15 wherein a measurement is provided utilizing a full bridge configuration with a capacitance being with three other capacitances.

18. The accelerometer of claim 16 wherein a capacitance measurement for the half bridge configuration is proof mass driven.

19. The accelerometer of claim 16 wherein a capacitance measurement for the half bridge configuration is electrode driven.

20. The accelerometer of claim 17 wherein a capacitance measurement for the full bridge configuration is proof mass driven.

21. The accelerometer of claim 17 wherein a capacitance measurement for the full bridge configuration is electrode driven.

* * * * *